(12) United States Patent
Cox

(10) Patent No.: US 10,774,897 B2
(45) Date of Patent: Sep. 15, 2020

(54) ELECTRONIC DAMPER CONTROL

(71) Applicant: MF IP Holding, LLC, West Jordan, UT (US)

(72) Inventor: Christopher Paul Cox, West Jordan, UT (US)

(73) Assignee: MF IP Holding, LLC, West Jordan, UT (US)

( * ) Notice: Subject to any disclaimer, the term of this patent is extended or adjusted under 35 U.S.C. 154(b) by 9 days.

(21) Appl. No.: 16/174,184

(22) Filed: Oct. 29, 2018

(65) Prior Publication Data

US 2020/0132155 A1    Apr. 30, 2020

(51) Int. Cl.
| F16F 9/512 | (2006.01) |
| F16F 9/516 | (2006.01) |
| F16F 9/32 | (2006.01) |
| B60G 17/08 | (2006.01) |

(52) U.S. Cl.
CPC ............ *F16F 9/5126* (2013.01); *B60G 17/08* (2013.01); *F16F 9/3214* (2013.01); *F16F 9/516* (2013.01)

(58) Field of Classification Search
CPC ........ F16F 9/5126; F16F 9/3214; F16F 9/516; F16F 9/3242; B60G 17/08
See application file for complete search history.

(56) References Cited

U.S. PATENT DOCUMENTS

| 4,284,178 A | * | 8/1981 | Tomita | ...................... | F16F 9/34 |
| | | | | | 188/281 |
| 6,659,240 B2 | * | 12/2003 | Dernebo | ............. | F15B 15/1466 |
| | | | | | 188/277 |
| 8,684,367 B2 | * | 4/2014 | Haugen | .................. | B60G 13/14 |
| | | | | | 280/5.515 |
| 2017/0008363 A1 | | 1/2017 | Ericksen et al. | | |

FOREIGN PATENT DOCUMENTS

EP    2 682 333 A2    1/2014

* cited by examiner

*Primary Examiner* — Xuan Lan Nguyen
(74) *Attorney, Agent, or Firm* — Christensen O'Connor Johnson Kindness PLLC

(57) ABSTRACT

Generally described, aspects of the disclosed subject matter are directed to electronically controlled dampers having shimmed pistons. In accordance with aspects of the present disclosure, the dampers generally include a shaft having a piston with compression and rebound valves extending therethrough. For further damper tuning and adjustment, a fluid bypass assembly permits damping fluid to bypass the piston during operation. The fluid bypass assembly may include a metering pin for manual adjustment of the fluid bypass, and a control valve for electronic adjustment of the fluid bypass. In this regard, the control valve may be controlled automatically, manually, or a combination thereof.

16 Claims, 8 Drawing Sheets

ELECTRONIC DAMPER CONTROL

BACKGROUND

A damper provides a damping force in reaction to motion. A damper is typically filled with a damping fluid to provide fluidic resistance to the motion of a piston traveling through the damping fluid. A conventional piston generally includes valves for compression flow of damping fluid and valves for rebound flow of damping fluid. In this regard, shims are used to block one set of valves during each motion of the piston. For example, if the damper is experiencing a compression stroke, the rebound valves are blocked by the rebound shims. Conversely, when the damper is in a rebound stroke, the compression valves are blocked by the compression shims.

Shim configuration can greatly impact the performance and damping characteristics of the damper. Generally, a combination of different thicknesses and sizes of shims (referred to as a "shim stack") is used to tailor the characteristics of the damper during use. Shims are typically metallic discs that are capable of bending with a low rate of fatigue. In this regard, spring steel is often a material used for the shims. When the damper is in a compression stroke, and the rebound valves are blocked by the rebound shims, the compression shim stack is necessarily bent away from the compression valves to allow flow of the damping fluid through the piston. The rate of the flow determines the damping force. If the compression shim stack allows freely flowing damping fluid through the compression valves, the damping effect will be small. If the compression shim stack greatly restricts flow of damping fluid through the compression valves, the damping effect will be high.

Tuning a damper with a shim stack has an influence on the performance and damping characteristics of the damper, the shims are often configured in a manner that provides consistent and repeatable damper performance. Although the damper can be tuned within a certain range of performance by adjusting the shim stacks, the tuning capability is limited. In some cases, the damper also includes a damping fluid bypass system, often metered mechanically. The damping fluid bypass system provides pressure relief across the piston without the need for the shim stack to deflect. In this regard, a damping fluid bypass system provides an increase in the range of damping characteristics of the damper that can be tuned. Typical damping fluid bypass systems have a single mechanical metering adjustment, and do not provide a method for adjustment based on feedback by the driver and/or the road conditions.

SUMMARY

In accordance with one embodiment of the present disclosure, an electronically controlled damper is provided. The electronically controlled damper generally includes a damper body defining a chamber for housing a damping fluid and having a first mounting portion at a distal end and a shaft aperture at a proximal end; an elongate shaft slidingly extending through the shaft aperture, the elongate shaft having a distal portion within the chamber and a proximal portion external to the chamber; a piston disposed at a distal end of the elongate shaft, the piston defining a first chamber portion at the distal end of the chamber and a second chamber portion at the proximal end of the chamber, the piston having a damping valve and configured to sealingly translate along the chamber; and a fluid bypass assembly external to the chamber at a proximal end of the elongate shaft. The fluid bypass assembly generally includes a second mounting portion; a first reservoir for the damping fluid in fluid communication with the first chamber portion; a second reservoir for the damping fluid in fluid communication with the second chamber portion; and a control valve having a plunger positioned between the first and second reservoirs and configured to selectively reciprocate from a closed position when de-energized, where damping fluid is prevented from flowing between the first and second reservoirs, to an open position when energized, where damping fluid is permitted to flow from the second reservoir to the first reservoir during a rebound stroke of the damper, wherein the plunger may be positioned such that pressure of the damping fluid in the second reservoir biases the plunger to the closed position during the rebound stroke of the damper.

In accordance with another embodiment of the present disclosure, an electronically controlled piston bypass system for a damper is provided. The electronically controlled piston bypass system for a damper generally includes an elongate shaft having a damping piston disposed at a distal end of the elongate shaft, the piston having a first side facing away from the elongate shaft, a second side opposite the first side, and a damping valve; and a fluid bypass assembly disposed at a proximal end of the elongate shaft. The fluid bypass assembly generally includes a first reservoir for receiving damping fluid in fluid communication with a passageway in the elongate shaft having an axial aperture opening toward the first side of the piston; a second reservoir for receiving damping fluid in fluid communication with an annular jacket surrounding the passageway and having a radial aperture through the elongate shaft; and a control valve having a plunger positioned between the first and second reservoirs and configured to selectively reciprocate from a closed position when de-energized, where damping fluid is prevented from flowing between the first and second reservoirs, to an open position when energized, where damping fluid is permitted to flow from the second reservoir to the first reservoir during a rebound stroke of the damper, wherein the plunger may be positioned such that pressure of the damping fluid in the second reservoir biases the plunger to the closed position during the rebound stroke of the damper.

In accordance with any of the embodiments described herein, the electronically controlled damper may further include a biasing member applying a return force to bias the plunger to the closed position, the biasing member may be configured to retract the plunger at a threshold positive pressure differential of the damping fluid between the first and second reservoirs during a compression stroke of the damper.

In accordance with any of the embodiments described herein, the electronically controlled damper may further include a metering pin positioned between the first and second reservoirs to adjustably allow damping fluid to flow therebetween.

In accordance with any of the embodiments described herein, the metering pin may have a tapered helical cut configured to variably adjust damping fluid flow.

In accordance with any of the embodiments described herein, the first reservoir may be in fluid communication with the first chamber portion through a passageway in the elongate shaft.

In accordance with any of the embodiments described herein, the electronically controlled damper may further include a check valve coupled to the elongate shaft adjacent to the piston, the check valve configured to allow damping fluid to flow out of the passageway into the first chamber during the rebound stroke of the damper, and to prevent damping fluid flow into the passageway from the first chamber during a compression stroke of the damper.

In accordance with any of the embodiments described herein, the second reservoir may be in fluid communication with the second chamber portion through a radial port and an annular jacket surrounding the passageway in the elongate shaft.

In accordance with any of the embodiments described herein, the electronically controlled damper may further include a pilot piston slidingly disposed in the passageway and configured to selectively prevent damping fluid flow from the passageway to the first chamber during the compression stroke of the damper when the plunger is in the open position.

In accordance with any of the embodiments described herein, the damping fluid may be directed through a secondary damping valve adjacent to the piston when the pilot piston is in a position to prevent damping fluid flow from the passageway the first chamber during the compression stroke of the damper.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
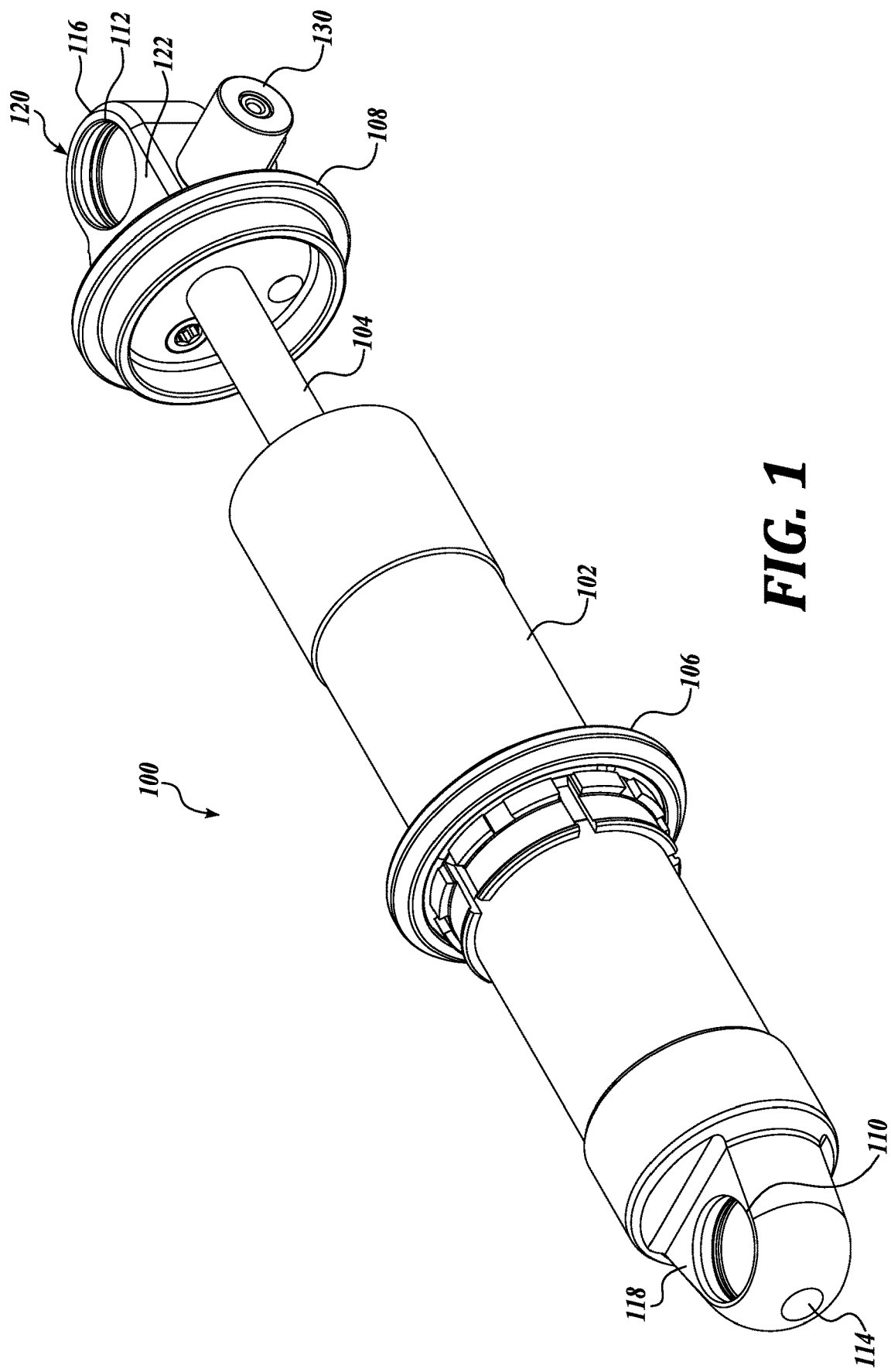
FIG. 1 is a right front top perspective view of one representative embodiment of an electronically controlled damper in accordance with an aspect of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to electronically controlled dampers having shimmed pistons to provide a damping effect. Embodiments of the present disclosure are generally directed to adjusting the damping characteristics of a damper using shim configurations in conjunction with a damping fluid piston bypass system. Embodiments of the dampers disclosed herein are suitable to attach to any components between which a damping force is desired (e.g., a vehicle suspension system). Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A damper having a shimmed piston generally includes an elongate shaft with a piston fixed at one end. As the shaft travels in an axial direction, the piston travels through hydraulic damping fluid in a central passageway of the damper body. The piston generally includes apertures (referred to as "valves") extending through the piston and sized such that the valves provide fluidic resistance as the piston travels through the hydraulic damping fluid. In this regard, the movement of the piston through the hydraulic damping fluid provides a force counter to the movement of the shaft, resulting in a damping effect of the motion of the shaft. The force provided by the hydraulic damping fluid is dependent on a range of factors, including hydraulic damping fluid viscosity, temperature, pressure, purity, composition; shaft velocity; and piston aperture size and shape, among other factors.

In a damper with a piston designed for use with a shim assembly (often referred to as a "shim stack"), the valves in the piston are configured such that only certain of the valves are intended for hydraulic damping fluid flow during a compression stroke of the damper (insertion of the shaft within the damper body), and certain other of the valves are intended for hydraulic damping fluid flow during a rebound stroke of a damper (extension of the shaft from the damper body). As a result, the valves can be tailored or "tuned" to exhibit the desired damping characteristics depending on the intended use of the damper. If shims were not used with the piston, an excess of hydraulic damping fluid would simultaneously flow through all of the valves, and would provide a low damping effect.

A shim stack used in conventional dampers has a wide variety of configurations. In general, the shims are arranged such that they provide a certain resistance to the flow of the hydraulic damping fluid through the valves. The valves have a shape and size to correspond to desired flow characteristics of the piston.

During certain movements of the damper, the hydraulic damping fluid does not quickly build enough pressure across the piston to deflect the shim stack before there is a change in direction of the piston between rebound and compression. During some of these types of movements of the damper, and other types of movement, it is desirable to include a damping fluid bypass system to provide further control and tuning of the damping characteristics of the damper. The fluid bypass system provides a metered fluid communication between the chambers on either side of the piston while bypassing the shim stacks in the piston. A fluid bypass system can include a mechanical control, and electronic control, or a combination thereof.

A damper typically has different damping effect depending on the speed of the shaft. In this regard, slow speed damping can be controlled using different valves or by a different amount of metering in the fluid bypass system. Using the automotive damper as an example, the slow speed damping may include rolling over the crest of a hill, or the compression of the suspension as the vehicle dives while braking or rotates into a corner. In contrast, the high speed damping may include hitting a bump at speed or driving on an uneven road surface. Often a damper will be designed to exhibit different damping characteristics for slow and high speed damping.

Although the valves in the piston can be arranged to provide certain damping characteristics for different damping speeds and amplitudes, the fluid bypass system provides a greater degree of control while working in conjunction with the valves in the piston. In one embodiment, the fluid bypass system includes a suitable control valve for selectively preventing and permitting damping fluid flow between the chambers on either side of the piston. In some embodiments, the control valve is configured to selectively prevent or permit damping fluid flow between the chambers on either side of the piston during a rebound stroke of the damper, but may not provide the selective control during the compression stroke of the damper. In other embodiments, the control valve is configured to provide selective control during both rebound and compression strokes of the damper.

Continuing with the automotive example, the performance of a vehicle may improve by providing a higher damping force during slow speed damping, and a lower damping force during high speed damping. In this example, the cornering (slower speed damping) of the vehicle may improve by keeping the chassis in a relatively neutral position, while encountering a sharp bump in that corner (high speed damping) allows the damper to deflect quickly with the bump and improve the contact of the tire with the road surface, increasing grip. Many other examples exist, such as having a higher damping effect during pedaling of a bicycle (slow speed damping) as opposed to a lower damping effect during bumps (high speed damping) for a smoother ride, especially while on an unimproved road. Although these examples are used to illustrate the potential uses for tailoring of a damper using valves and a fluid bypass system, it should be appreciated that the embodiments of the present disclosure are intended for any suitable valve in fluid bypass system configuration and damping installation.

Figure 2:
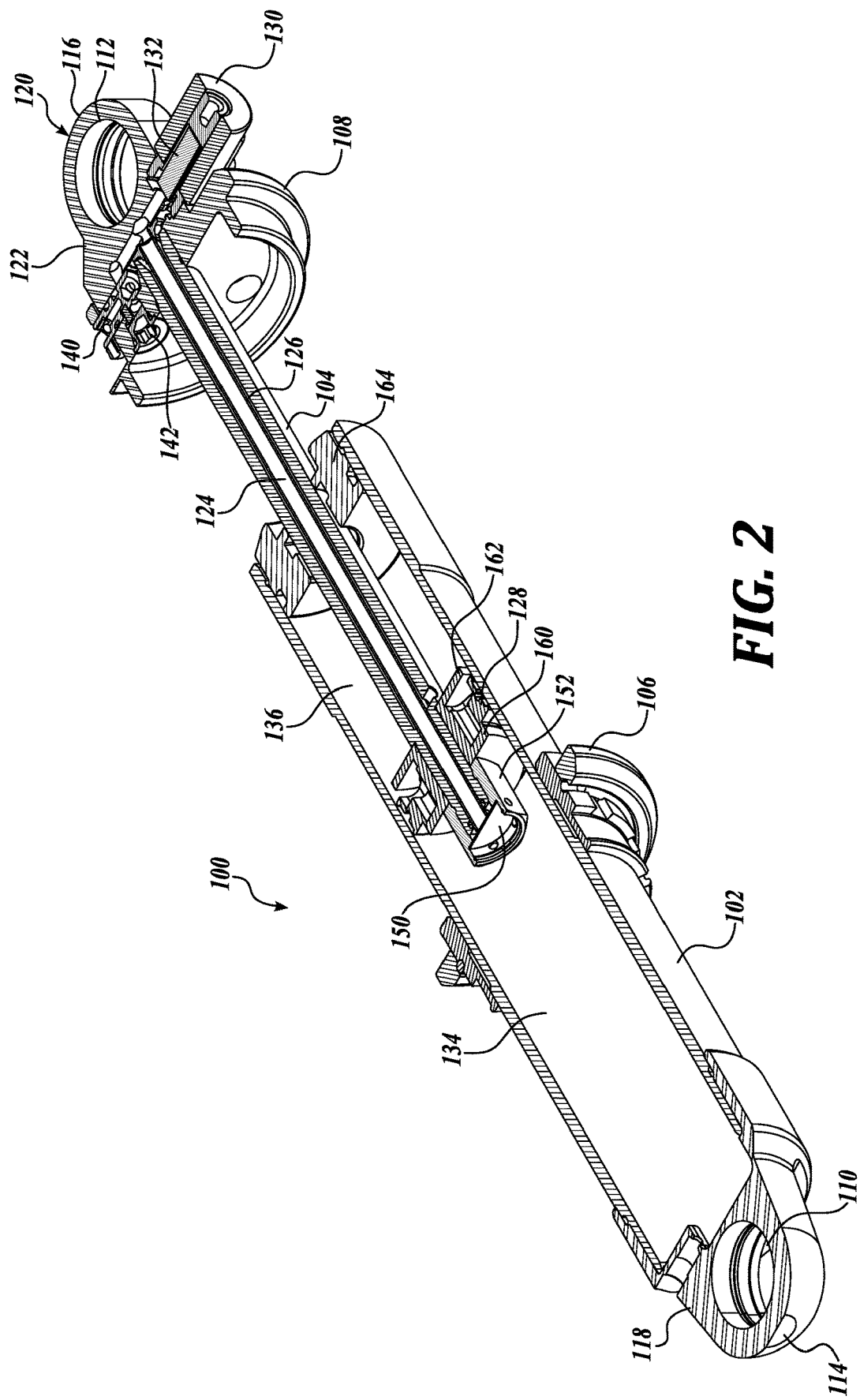
FIG. 2 is a cutaway right front top perspective view of the electronically controlled damper of FIG. 1.

Referring initially to FIGS. 1 and 2, a first exemplary embodiment of an electronically controlled damper assembly 100 is depicted. The electronically controlled damper assembly 100 is shown having a damper body 102 and an elongate shaft 104 slidingly associated with the damper body 102 and traveling through a shaft seal 164 configured to prevent damping fluid from escaping the damper body 102. During use of the damper, the elongate shaft 104 is configured to slide with respect to the damper body 102 such that a piston 128 coupled to the elongate shaft 104 travels through a damping fluid within a chamber defined by the damper body 102. As the piston 128 travels through the damping fluid, the motion of the elongate shaft 104 is dampened based on the configuration of components of the electronically controlled damper assembly 100, as will be explained in greater detail below.

In the illustrated embodiment shown in FIG. 1, the electronically controlled damper assembly 100 includes a first spring seat 106 positioned along the damper body 102 for constraining a spring (not shown) which provides a bias to position the damper assembly 100 in an intermediate extended position when the damper assembly 100 is installed, e.g., on a vehicle. The electronically controlled damper assembly 100 includes a second spring seat 108 positioned at a proximal end of the elongate shaft 104 to constraining the spring. In some embodiments, the first spring seat 106 is adjustable along the damper body 102 such that the length of the installed damper assembly 100 can be adjusted, such as to change the ride height of the vehicle suspension system. In other embodiments, the second spring seat 108 is adjustable along the elongate shaft 104, and in further embodiments, both the first and second spring seats 106 and 108 are adjustable.

In some embodiments, to mount the electronically controlled damper assembly 100 to an installation position, such as on a vehicle, the damper body 102 includes a distal eyelet 110 in a damper body cap 118 at a distal end 114 of the electronically controlled damper assembly 100. The distal eyelet 110 is provided to accept a first mounting bolt or stud (not shown) therethrough. At the opposite end of the electronically controlled damper assembly 100, a proximal eyelet 112 is positioned at a proximal end 116 of the electronically controlled damper assembly 100, and provided to accept a second mounting bolt or stud (not shown) therethrough. Although the distal and proximal eyelets 110 and 112 are shown with the respective axes aligned, in other embodiments the distal and proximal eyelets 110 and 112 are suitably oriented in any direction, respectively.

As shown in FIG. 2, in some embodiments, the damper body 102 defines a chamber configured to retain damping fluid. The chamber includes a first chamber portion 134 in the damper body 102 near the distal end 114, and a second chamber portion 136 in the damper body 102 toward the proximal end 116. The first and second chamber portions 134 and 136 change in length and volume as the elongate shaft 104 moves the piston 128 along the damper body 102. When the electronically controlled damper 100 is fully compressed, the first chamber portion 134 is minimized and the second chamber portion 136 is maximized. When the electronically controlled damper 100 is fully extended, the first chamber portion 134 is maximized and the second chamber portion 136 is minimized.

As described above, the change in length and volume of the first and second chamber portions 134 and 136 requires the transfer of damping fluid. In some embodiments, the piston 128 includes a rebound shim stack 160 and a compression shim stack 162 to provide resistance to the movement of the elongate shaft 104 during use of the electronically controlled damper 100. As the elongate shaft 104 extends out of the damper body 102 during a rebound stroke, the differential pressure of the damping fluid between the first and second chamber portions 134 and 136 deflects the rebound shim stack 160 to permit damping fluid to flow from the second chamber portion 136 to the first chamber portion 134 through valves in the piston 128. Similarly, as the elongate shaft 104 retracts into the damper body 102 during a compression stroke, the differential pressure of the damping fluid between the first and second chamber portions 134 and 136 deflects the compression shim stack 162 to permit damping fluid to flow from the first chamber portion 134 to the second chamber portion 136.

As explained above, the deflection of the rebound and compression shim stacks 160 and 162 provides a damping effect to the movement of the elongate shaft 104 with respect to the damper body 102. The configuration of the rebound and compression shim stacks 160 and 162 provides adjustment to the damping characteristics based on various movements of the elongate shaft 104 with respect to the damper body 102. In this regard, adjustment of the configuration of the rebound and compression shim stacks 160 and 162 has a tuning effect on the electronically controlled damper 100. Adjustment of such configurations of the rebound and compression shim stacks 160 and 162 has a limited effect on the damping characteristics. To provide further tuning and adjustability of the electronically controlled damper 100, a fluid bypass assembly 120 is provided. In the illustrated embodiments, the fluid bypass assembly 120 is coupled to the elongate shaft 104 at the proximal end 116.

Turning to FIG. 2, the fluid bypass assembly 120 will now be explained in greater detail. In some embodiments, the fluid bypass assembly 120 includes a bypass housing 122 having the proximal eyelet 112 at the proximal end 116. The bypass housing 122 is mounted on the proximal end of the elongate shaft 104. In the illustrated embodiment, the fluid bypass assembly includes a control valve 130 having a plunger 132. In some embodiments, the control valve 130 is an electronic solenoid valve configured to move the plunger 132 from a closed position (see FIG. 5), to an open position (see FIG. 6). In other embodiments, the control valve 130 is any mechanical, electronic, pneumatic, or other valve configured to selectively move the plunger 132 between the closed and open positions.

In certain embodiments, the fluid bypass assembly 120 further includes a metering pin 140. In these embodiments, metering pin 140 is suitably a mechanical metering component, for example, having a tapered helical aperture which meters damping fluid flow based on the clocked position of the metering pin 140. In other embodiments, the metering pin 140 is any suitable component configured to adjustably meter damping fluid flow. In some embodiments, an access plug 142 is provided to allow access to install and remove the metering pin 140. In other embodiments, the metering pin 140 is suitably positioned in any orientation with respect to the elongate shaft 104. In certain embodiments, the metering pin 140 is positioned in axial alignment with the elongate shaft 104.

Figure 3:
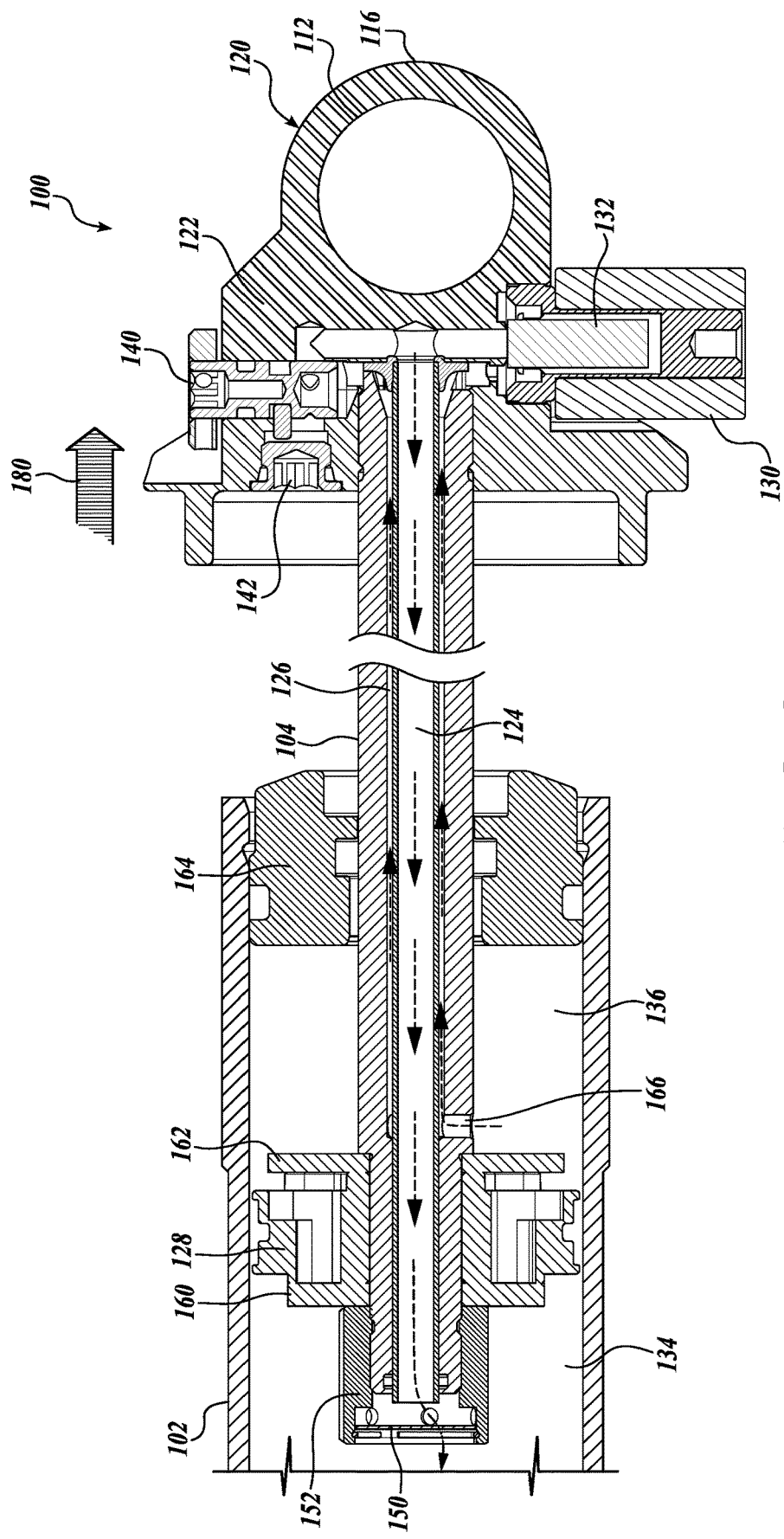
FIG. 3 is a cutaway right detail view of the electronically controlled damper of FIG. 1, showing damping fluid motion during a rebound stroke of the electronically controlled damper.
Figure 4:
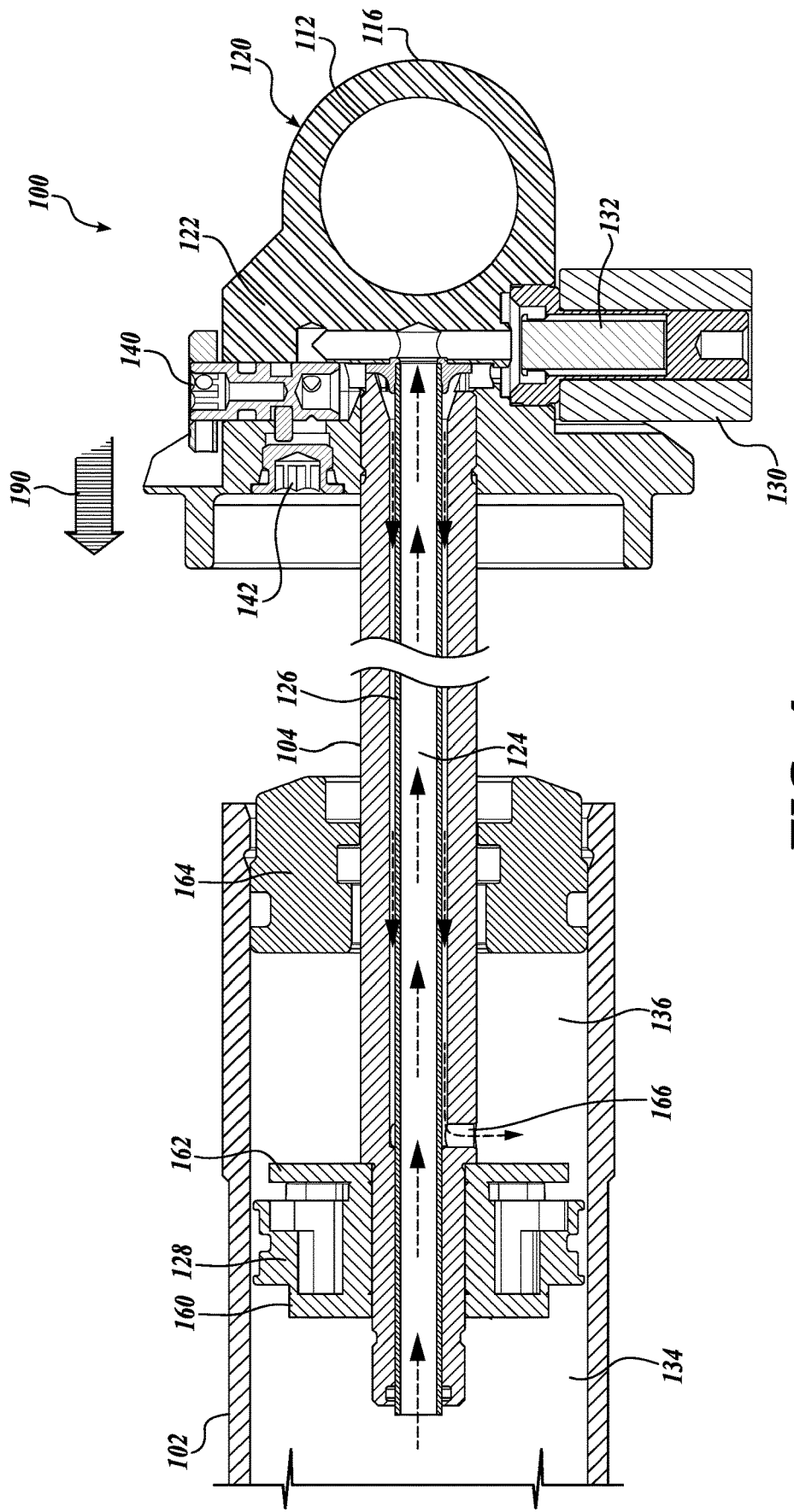
FIG. 4 is a cutaway right detail view of the electronically controlled damper of FIG. 1, showing damping fluid motion during a compression stroke of the electronically controlled damper.

Turning now to FIGS. 3 and 4, the damping fluid flow to and from the fluid bypass assembly 120 will now be explained in greater detail. In the illustrated embodiment, the elongate shaft 104 includes a central passageway 124 extending along the length of the elongate shaft 104. The central passageway 124 is configured to provide fluid communication between the first chamber portion 134 and the fluid bypass assembly 120. In some embodiments, as shown in FIG. 3, the distal end of the elongate shaft 104 includes a suitable check valve 152 having a floating disc 150. In these embodiments, the floating disc 150 translates from an open position, where fluid in the central passageway 124 is permitted to flow into the first chamber portion 134 during a rebound stroke, to a closed position (not shown), where fluid is prevented from flowing into the central passageway 124 during a compression stroke. In other embodiments, the check valve 152 is omitted (see, e.g., FIG. 4).

The elongate shaft 104 further includes an annular jacket 126 coaxially surrounding the central passageway 124 partially along the length of the elongate shaft 104. The annular jacket 126 is configured to provide fluid communication between the second chamber portion 136 and the fluid bypass assembly 120. In the illustrated embodiment, the elongate shaft 104 includes one or more radial ports 166 fluidly connecting the annular jacket 126 and the second chamber portion 136 for damping fluid transfer. In other embodiments, any suitable configuration of ports, slots, or openings to allow damping fluid transfer between the annular jacket 126 and the second chamber portion 136 is also within the scope of the present disclosure.

As shown in the illustrated embodiment of FIG. 3, as the elongate shaft 104 travels in the direction of a rebound stroke 180, the damping fluid flows through the passageways in the elongate shaft 104 as depicted by representative arrows. In this extension motion of the elongate shaft 104, to bypass the valves in the piston 128, the damping fluid is required to flow from the second chamber portion 136 to the first chamber portion 134 through the fluid bypass assembly 120. As shown, the damping fluid travels through the radial port 166 into the annular jacket 126 and to the fluid bypass assembly 120. From the fluid bypass assembly 120, the damping fluid travels through the central passageway 124 and into the first chamber portion 134.

As shown in the illustrated embodiment of FIG. 4, as the elongate shaft 104 travels in the direction of a compression stroke 190, the damping fluid flows through the passageways in the elongate shaft 104 as depicted by representative arrows. In this retraction motion of the elongate shaft 104, to bypass the valves in the piston 128, the damping fluid is required to flow from the first chamber portion 134 to the second chamber portion 136 through the fluid bypass assembly 120. As shown, the damping fluid travels from the first chamber portion 134 to the fluid bypass assembly 120 through the central passageway 124. From the fluid bypass assembly 120, the damping fluid travels through the annular jacket 126 and out the radial port 166 into the second chamber portion 136.

Figure 5:
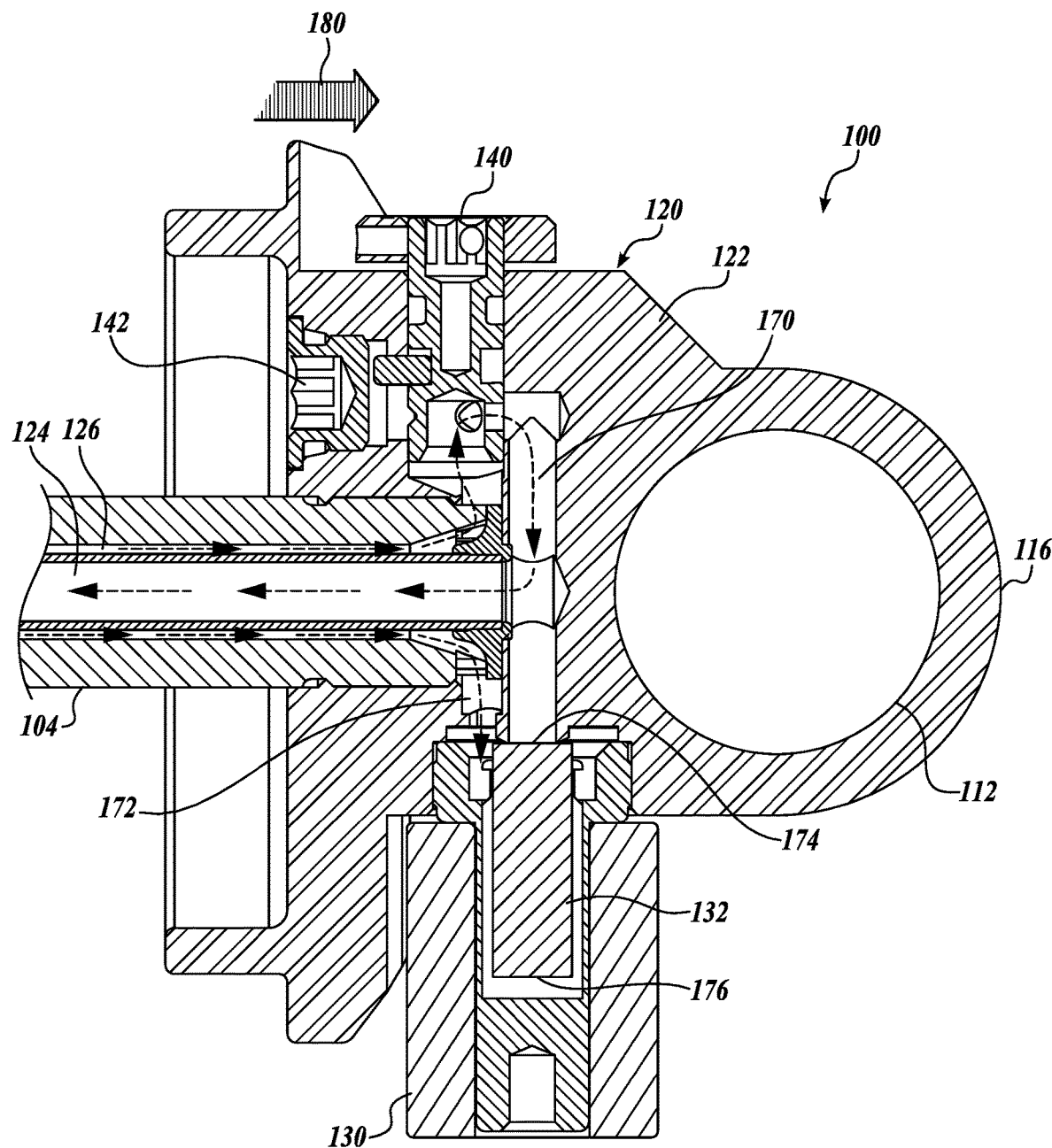
FIG. 5 is a cutaway right detail view of a valve bypass assembly of the electronically controlled damper of FIG. 1, showing damping fluid motion during a rebound stroke of the electronically controlled damper with the solenoid in a closed position.
Figure 6:
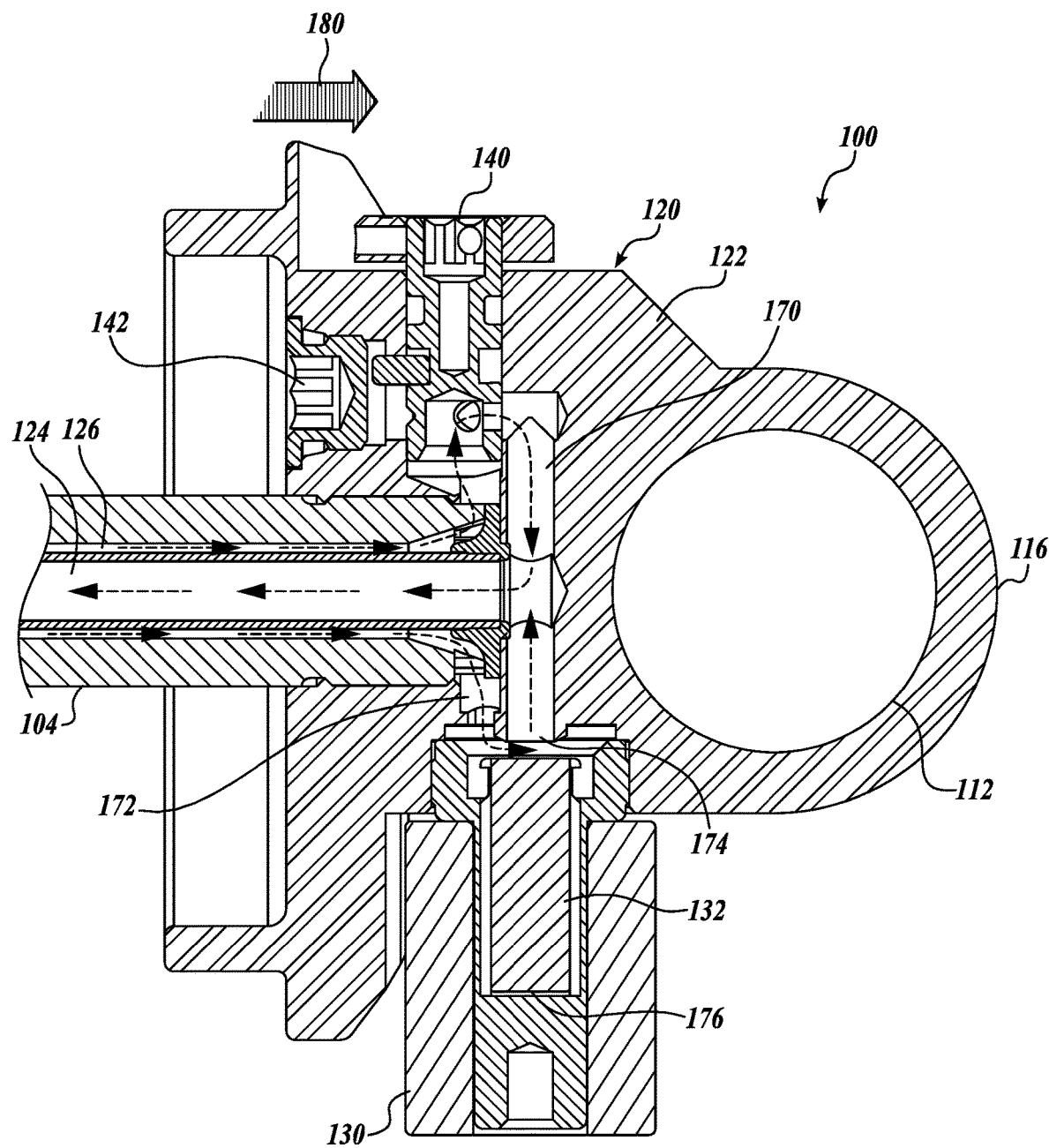
FIG. 6 is a cutaway right detail view of the valve bypass assembly of FIG. 5, showing damping fluid motion during a rebound stroke of the electronically controlled damper with the solenoid in an open position.
Figure 7:
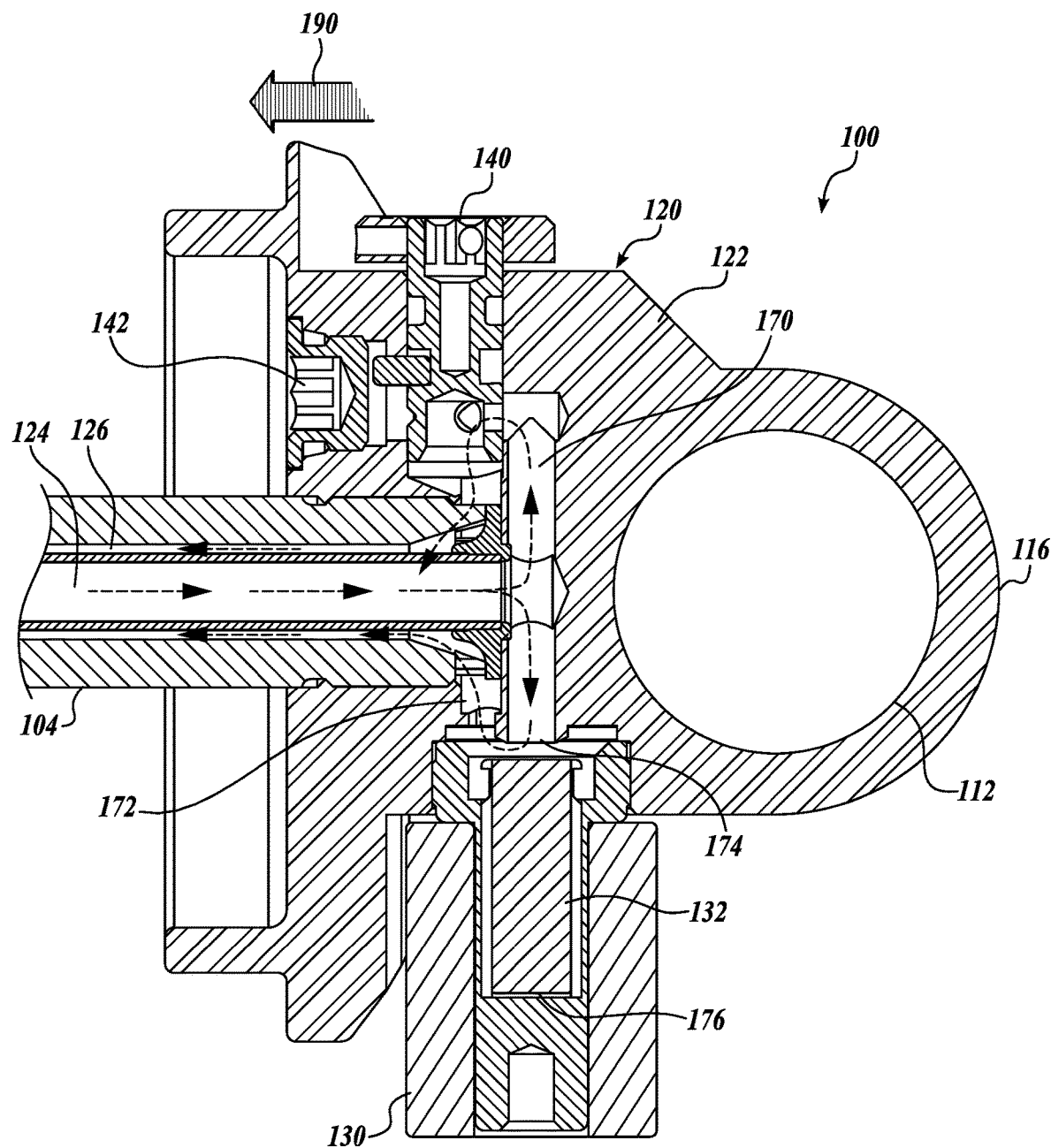
FIG. 7 is a cutaway right detail view of the valve bypass assembly of FIG. 5, showing damping fluid motion during a compression stroke of the electronically controlled damper with the solenoid in an open position.

Turning now to FIGS. 5-7, the damping fluid flow through the fluid bypass assembly 120 will now be described in greater detail. As shown, FIGS. 5 and 6 represent the fluid flow during the rebound stroke 180, and FIG. 7 represents the fluid flow during the compression stroke 190. Referring initially to FIG. 5, the fluid bypass assembly 120 further includes a first reservoir 170 in fluid communication with the central passageway 124 of the elongate shaft 104, and a second reservoir 172 in fluid communication with the annular jacket 126 of the elongate shaft 104. The plunger 132 of the control valve 130 is seated against a flow aperture 174 to control damping fluid flow between the first and second reservoirs 170 and 172.

During the rebound stroke 180, damping fluid flows through the annular jacket 126 and into the second reservoir 172, through any suitable opening, such as castellations at the proximal end of the elongate shaft 104. In some embodiments, the damping fluid additionally flows through a passageway to the metering pin 140 from the annular jacket 126. In this regard, when the plunger 132 is in the closed position (FIG. 5), fluid is not permitted to flow from the second reservoir 172 to the first reservoir 170 through the flow aperture 174, and instead selectively flows from the annular jacket 126 through the metering pin 140 into the first reservoir 170 based on the clocking of the metering pin 140. As described above, in some embodiments, the metering pin 140 provides a metered damping fluid flow from the annular jacket 126 to the first reservoir 170 and into the central passageway 124. In these embodiments, the metering pin 140 may include a tapered helical cut which provides adjustable fluid flow based on the clocking of the metered pin 140.

In the embodiment shown in FIG. 5, the damping fluid pressure in the second reservoir 172 exerts a fluid pressure force against the surfaces of the plunger 132 within the second reservoir 172. When the plunger 132 is in the closed position, the damping fluid pressure against a surface 176 of the plunger 132 distal to the flow aperture 174 provides a force to bias the plunger 132 against the flow aperture 174 and retain the plunger 132 in the closed position until the control valve 130 retracts the plunger 132 to the open position. In this configuration, to maintain the plunger 132 in the closed position, the control valve 130 is not required to energize to maintain the seal at the flow aperture 174. As such, the control valve 130 may be sized and configured in an efficient manner in relation to the size of the electronically controlled damper 100.

When the plunger 132 is retracted by the control valve 130 and in the open position (FIG. 6), fluid is permitted to flow from the second reservoir 172, through the flow aperture 174, to the first reservoir 170, and toward the first chamber portion 134 through the central passageway 124, as shown by the representative arrows. In this embodiment, some damping fluid may also flow through the metering pin 140 when the plunger 132 is in the open position. Retracting the plunger 132 to the open position provides maximum damping fluid flow between the first and second reservoirs 170 and 172 and around the piston 128. The result of the damping fluid bypass is a selectively lower damping resistance state of the electronically controlled damper 100. The lower damping resistance state may be desirable to provide a softer suspension ride for the vehicle, partially based on electronic control of the control valve 130. In some embodiments, the control valve 130 is controlled automatically by a controller (not shown), which may be programmed based on one or more of a driver preference, vehicle weight, vehicle performance, real-time damper feedback, various sensors, road type, etc. In other embodiments, the control valve 130 is controlled manually by a user, or any combination of manual and automatic control.

During a compression stroke 190, as shown in FIG. 7, the damping fluid travels through the central passageway 124 and into the first reservoir 170. As damping fluid pressure builds in the first reservoir 170, the force on the plunger 132 overcomes the force of the control valve 130 such that the plunger 132 retracts to the open position, allowing damping fluid to flow through the flow aperture 174 and into the second reservoir 172. In some embodiments, the plunger 132 includes a biasing member (not shown) tending to bias the plunger 132 to the closed position (see FIG. 5). In these embodiments, the biasing member is configured to allow the plunger 132 to retract based on a threshold pressure differential between the first reservoir 170 and the second reservoir 172. In this regard, during a compression stroke 190, damping fluid is permitted to bypass the piston 128 when the pressure of the damping fluid in the first reservoir 170 overcomes the biasing member of the plunger 132. As described above, in some embodiments, the check valve 152 is provided to prevent the pressure of the damping fluid in the first reservoir 170 overcoming the biasing member of the plunger 132. As with the bypassed damping fluid flow of FIG. 6, some of the damping fluid may also flow through the metering pin 140 during the compression stroke 190 of the electronically controlled damper 100.

Figure 8:
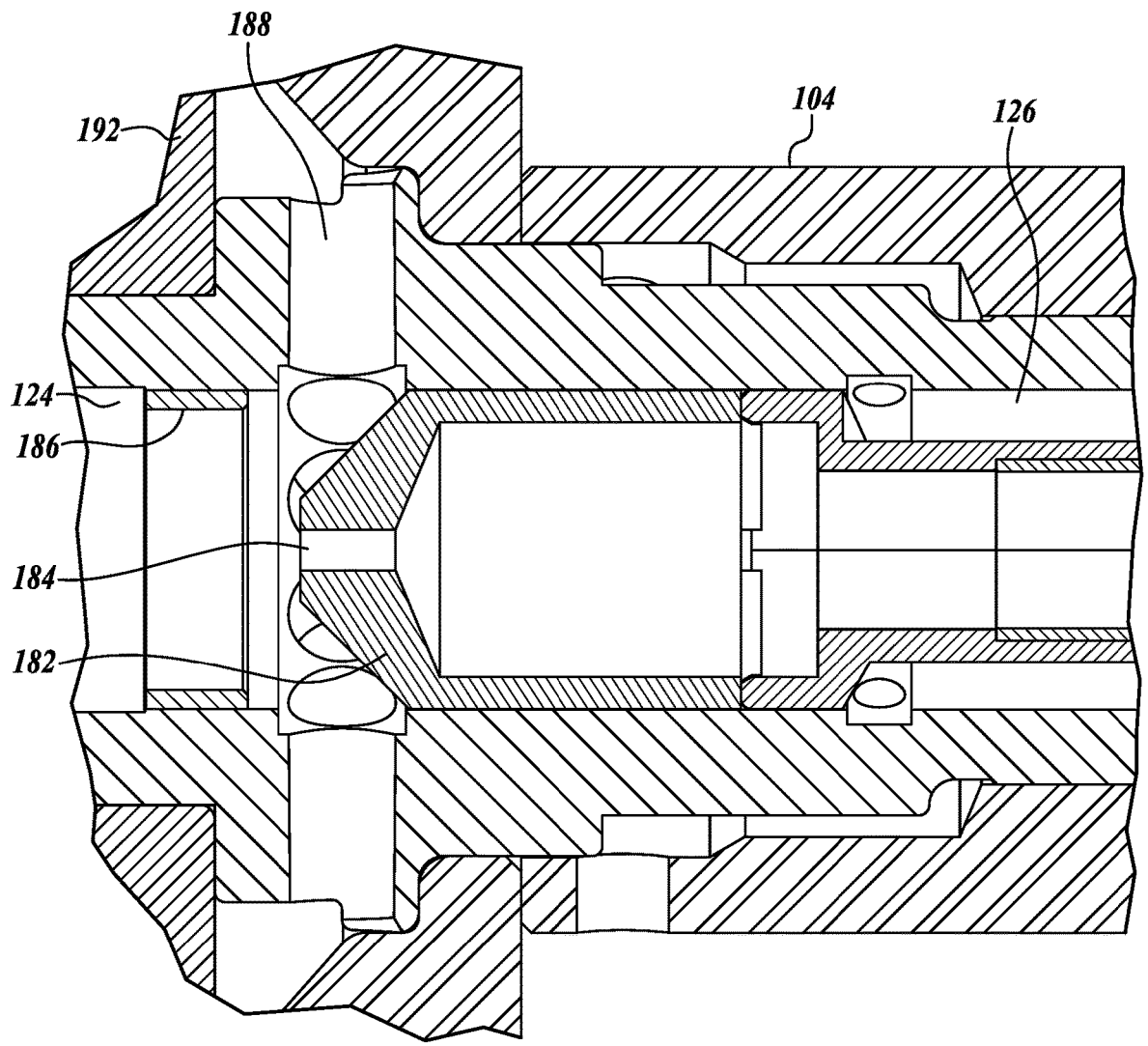
FIG. 8 is a detail view of one representative embodiment of a pilot piston for the electronically controlled damper of FIG. 1.

Turning now to FIG. 8, in some embodiments, the damping fluid flow between the first chamber portion 134 and the second chamber portion 136 is controlled by the control valve 130 with a pilot piston 182 slidingly disposed in the central passageway 124. The pilot piston 182 includes an orifice 184 which controls the movement of the pilot piston 182 depending on the damping fluid flow direction. During a compression stroke, the damping fluid flows into the central passageway 124 and against the pilot piston 182, tending to bias the pilot piston 182 toward the proximal and 116, as shown in FIG. 8. In this configuration, the damping fluid flows through one or more radial ports 188 and into the second chamber portion 136. Between the radial ports 188 and the second chamber portion 136, a secondary shim stack, e.g., secondary valve 192, may be provided to regulate the damping fluid flow into the second chamber portion 136. During a rebound stroke, the damping fluid flows from the fluid bypass assembly 120, along the central passageway 124, and toward the pilot piston 182. The damping fluid pressure exerts a force on the pilot piston 182 toward the distal and 114. This force causes the pilot piston 182 to slide toward the distal end 114 until the pilot piston 182 abuts a pilot piston seat 186. In the rebound stroke position of the pilot piston 182, damping fluid is permitted to flow through the orifice 184 and into the first chamber portion 134.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. An electronically controlled damper, comprising:
  a damper body defining a chamber for housing a damping fluid and having a first mounting portion at a distal end and a shaft aperture at a proximal end;
  an elongate shaft slidingly extending through the shaft aperture, the elongate shaft having a distal portion within the chamber and a proximal portion external to the chamber;

a piston disposed at a distal end of the elongate shaft, the piston defining a first chamber portion at the distal end of the chamber and a second chamber portion at the proximal end of the chamber, the piston having a damping valve and configured to sealingly translate along the chamber; and a fluid bypass assembly external to the chamber at a proximal end of the elongate shaft, the fluid bypass assembly comprising:

a second mounting portion;

a first reservoir for the damping fluid in fluid communication with the first chamber portion;

a second reservoir for the damping fluid in fluid communication with the second chamber portion; and a control valve having a plunger positioned between the first and second reservoirs and configured to selectively reciprocate from a closed position when de-energized, where damping fluid is prevented from flowing between the first and second reservoirs, to an open position when energized, where damping fluid is permitted to flow from the second reservoir to the first reservoir during a rebound stroke of the damper, wherein the plunger is positioned such that pressure of the damping fluid in the second reservoir exerts a force to bias the plunger toward the closed position during the rebound stroke of the damper.

2. The electronically controlled damper of claim 1, further comprising a biasing member applying a return force to bias the plunger toward the closed position, the biasing member configured to permit the plunger to retract to the open position at a threshold positive pressure differential of the damping fluid between the first and second reservoirs during a compression stroke of the damper.

3. The electronically controlled damper of claim 1, further comprising a metering pin positioned between the first and second reservoirs to adjustably allow damping fluid to flow therebetween.

4. The electronically controlled damper of claim 3, wherein the metering pin has a tapered helical cut configured to variably adjust damping fluid flow.

5. The electronically controlled damper of claim 1, wherein the first reservoir is in fluid communication with the first chamber portion through a passageway in the elongate shaft.

6. The electronically controlled damper of claim 5, further comprising a check valve coupled to the elongate shaft adjacent to the piston, the check valve configured to allow damping fluid to flow out of the passageway into the first chamber during the rebound stroke of the damper, and to prevent damping fluid flow into the passageway from the first chamber during a compression stroke of the damper.

7. The electronically controlled damper of claim 5, wherein the second reservoir is in fluid communication with the second chamber portion through a radial port and an annular jacket surrounding the passageway in the elongate shaft.

8. The electronically controlled damper of claim 7, further comprising a pilot piston slidingly disposed in the passageway and configured to selectively permit damping fluid flow from the passageway to the second chamber during the compression stroke of the damper.

9. The electronically controlled damper of claim 8, wherein the damping fluid is directed through a secondary damping valve adjacent to the piston in the second chamber when the pilot piston is in a position to permit damping fluid flow from the passageway to the second chamber during the compression stroke of the damper.

10. An electronically controlled piston bypass system for a damper, comprising:

an elongate shaft having a damping piston disposed at a distal end of the elongate shaft, the piston having a first side facing away from the elongate shaft, a second side opposite the first side, and a damping valve; and a fluid bypass assembly disposed at a proximal end of the elongate shaft, comprising:

a first reservoir for receiving damping fluid in fluid communication with a passageway in the elongate shaft having an axial aperture opening toward the first side of the piston;

a second reservoir for receiving damping fluid in fluid communication with an annular jacket surrounding the passageway and having a radial aperture through the elongate shaft; and a control valve having a plunger positioned between the first and second reservoirs and configured to selectively reciprocate from a closed position when de-energized, where damping fluid is prevented from flowing between the first and second reservoirs, to an open position when energized, where damping fluid is permitted to flow from the second reservoir to the first reservoir during a rebound stroke of the damper, wherein the plunger is positioned such that pressure of the damping fluid in the second reservoir exerts a force to bias the plunger to the closed position during the rebound stroke of the damper.

11. The electronically controlled piston bypass system for a damper of claim 10, further comprising a biasing member applying a return force to bias the plunger to the closed position, the biasing member configured to permit the plunger to retract to the open position at a threshold positive pressure differential between the first and second reservoirs during a compression stroke of the damper.

12. The electronically controlled piston bypass system for a damper of claim 10, further comprising a metering pin positioned between the first and second reservoirs to adjustably allow damping fluid to flow therebetween.

13. The electronically controlled piston bypass system for a damper of claim 12, wherein the metering pin has a tapered helical cut configured to variably adjust damping fluid flow.

14. The electronically controlled piston bypass system for a damper of claim 10, further comprising a check valve coupled to the elongate shaft adjacent to the piston, the check valve configured to allow damping fluid to flow out of the passageway through the axial aperture during the rebound stroke of the damper, and to prevent fluid flow into the passageway through the axial aperture during a compression stroke of the damper.

15. The electronically controlled damper of claim 10, further comprising a pilot piston slidingly disposed in the passageway and configured to selectively permit damping fluid flow from the passageway to the second chamber during the compression stroke of the damper.

16. The electronically controlled damper of claim 15, wherein the damping fluid is directed through a secondary damping valve adjacent to the piston in the second chamber when the pilot piston is in a position to permit damping fluid flow from the passageway to the second chamber during the compression stroke of the damper.

* * * * *